United States Patent
Patel et al.

(10) Patent No.: US 10,057,105 B2
(45) Date of Patent: Aug. 21, 2018

(54) ARCHITECTURE FRAMEWORK TO REALIZE PUSH-TO-X SERVICES USING CLOUDBASED STORAGE SERVICES

(71) Applicant: Kodiak Networks Inc., Plano, TX (US)

(72) Inventors: Krishnakant M. Patel, Richardson, TX (US); Brahmananda R. Vempati, Dallas, TX (US); Harisha M. Negaluguli, Richardson, TX (US); Ramu Kandula, Plano, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 0 days.

(21) Appl. No.: 15/584,682

(22) Filed: May 2, 2017

(65) Prior Publication Data
US 2017/0237600 A1 Aug. 17, 2017

Related U.S. Application Data

(63) Continuation of application No. PCT/US2015/058821, filed on Nov. 3, 2015.
(Continued)

(51) Int. Cl.
*H04W 72/00* (2009.01)
*H04L 29/08* (2006.01)
(Continued)

(52) U.S. Cl.
CPC .. *H04L 29/08693* (2013.01); *G06F 17/30283* (2013.01); *G06F 17/30876* (2013.01);
(Continued)

(58) Field of Classification Search
CPC ......... H04L 29/08693; H04L 29/06197; H04L 61/2084; H04L 61/30; H04W 88/08;
(Continued)

(56) References Cited

U.S. PATENT DOCUMENTS 3,912,874 A 10/1975 Botterell et al.
4,796,293 A 1/1989 Blinken et al.
(Continued)

FOREIGN PATENT DOCUMENTS

GB 2338150 A 3/1998
JP 200392776 A 10/2004
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — William Nealon

(57) ABSTRACT

An architecture framework to realize Push-to-X services using cloud-based storage services. Push-to-X messages are transmitted between mobile units by messaging servers. The Push-to-X message may include a short text message contained wholly within the Push-to-X message, or the Push-to-X message may include one or more attachments that comprise multimedia contents, files, or location information, which are stored on storage servers, wherein the Push-to-X message identifies a location for retrieving the attachments from the storage servers. The Push-to-X messages may be sent to a single mobile unit identified by a Mobile Directory Number (MDN) or a group of mobile units identified by a list of MDNs or a Uniform Resource Identifier (URI).

22 Claims, 8 Drawing Sheets

Related U.S. Application Data

(60) Provisional application No. 62/074,391, filed on Nov. 3, 2014.

(51) Int. Cl.
   *G06F 17/30* (2006.01)
   *H04L 29/06* (2006.01)
   *H04W 4/60* (2018.01)
   *H04W 88/08* (2009.01)

(52) U.S. Cl.
   CPC .. *G06F 17/30882* (2013.01); *H04L 29/06197* (2013.01); *H04W 4/60* (2018.02); *H04W 88/08* (2013.01)

(58) Field of Classification Search
   CPC .............. H04W 72/06; H04W 72/1236; G06F 17/30283; G06F 17/30876; G06F 17/30882
   USPC ....................................................... 455/452.2
   See application file for complete search history.

(56) References Cited

U.S. PATENT DOCUMENTS

| | | |
|---|---|---|
| 5,293,449 A | 3/1994 | Tzeng |
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 6/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,330,540 B2 | 2/2008 | Darby et al. |
| 7,366,535 B2 | 4/2008 | Glass et al. |
| 7,403,775 B2 | 7/2008 | Patel et al. |
| 7,460,861 B2 | 12/2008 | Zabawskj |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 9,282,130 B1 | 3/2016 | Goepp |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0059384 A1* | 5/2002 | Kaars .................... H04L 51/08 709/206 |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Wetman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0064887 A1* | 3/2005 | Bengtsson ............. H04L 51/38 455/466 |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0086799 A1* | 4/2006 | Robertson ............ G06Q 10/107 235/462.1 |
| 2006/0094455 A1 | 5/2006 | Hannu et al. |

(56) References Cited

U.S. PATENT DOCUMENTS

| | | |
|---|---|---|
| 2006/0116150 A1 | 6/2006 | Bhutiani |
| 2006/0128411 A1 | 6/2006 | Turcanu |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | Ladue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |
| 2007/0049314 A1 | 3/2007 | Balachandran et al. |
| 2007/0070976 A1 | 3/2007 | Mussman et al. |
| 2007/0094409 A1 | 4/2007 | Crockett et al. |
| 2007/0099609 A1 | 5/2007 | Cai |
| 2007/0133478 A1 | 6/2007 | Armbruster et al. |
| 2007/0133757 A1 | 6/2007 | Girouard et al. |
| 2007/0154005 A1 | 7/2007 | Daigle |
| 2007/0177602 A1 | 8/2007 | Pichelin et al. |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0159128 A1 | 7/2008 | Shaffer et al. |
| 2008/0299953 A1 | 12/2008 | Rao |
| 2009/0080356 A1 | 3/2009 | Song et al. |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0185040 A1* | 7/2009 | Yang ................ H04L 65/4092 348/207.11 |
| 2009/0209235 A1 | 8/2009 | Lawler et al. |
| 2009/0279512 A1 | 11/2009 | Fujishima et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0197335 A1 | 8/2010 | Jin et al. |
| 2010/0226286 A1* | 9/2010 | Rossotto .......... H04L 29/06027 370/259 |
| 2010/0234018 A1 | 9/2010 | Lawler et al. |
| 2011/0151884 A1* | 6/2011 | Zhao ................ H04W 72/1205 455/452.1 |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0026947 A1 | 2/2012 | Miller et al. |
| 2012/0115500 A1* | 5/2012 | Chen ................... H04W 88/08 455/452.2 |
| 2012/0196630 A1* | 8/2012 | Kawalkar ............ G06F 3/0216 455/466 |
| 2012/0278496 A1 | 11/2012 | Hsu |
| 2013/0021933 A1 | 1/2013 | Kowali et al. |
| 2013/0021965 A1 | 1/2013 | Chu et al. |
| 2013/0155875 A1 | 6/2013 | Ayyasamy et al. |
| 2013/0196706 A1 | 8/2013 | Patel et al. |
| 2013/0272436 A1 | 10/2013 | Makhlouf et al. |
| 2013/0337859 A1 | 12/2013 | Patel et al. |
| 2014/0078898 A1 | 3/2014 | Anchan et al. |
| 2014/0133443 A1 | 5/2014 | Malladi et al. |
| 2014/0148210 A1 | 5/2014 | Kundu et al. |
| 2015/0078295 A1 | 3/2015 | Mandyam et al. |
| 2015/0085797 A1 | 3/2015 | Ji et al. |
| 2015/0092704 A1 | 4/2015 | Chen |
| 2015/0365961 A1 | 12/2015 | Strasman |
| 2016/0269945 A1 | 9/2016 | Jang |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |
| WO | 2015105970 A1 | 7/2015 |

OTHER PUBLICATIONS

Nokia: "What is TETRA? Why Nokia TETRA?", The Nokia TETRA Primer, 2002, pp. 1- 29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", Trackwell.com, Oct. 2002, pp. 1-1.

* cited by examiner

ARCHITECTURE FRAMEWORK TO REALIZE PUSH-TO-X SERVICES USING CLOUDBASED STORAGE SERVICES

CROSS-REFERENCE TO RELATED APPLICATIONS

This application is a continuation of International Patent Application No. PCT/US2015/058821, filed on Nov. 3, 2015, which claims the benefit under 35 U.S.C. Section 119(e) of the following commonly-assigned patent application: U.S. Provisional Application Ser. No. 62/074,391, filed on Nov. 3, 2014, by Krishnakant M. Patel, Brahmananda R. Vempati, Harisha Mahabaleshwara Negalaguli, and Ramu Kandula, entitled "ARCHITECTURE FRAMEWORK TO REALIZE PUSH-TO-X SERVICES USING CLOUD-BASED STORAGE SERVICES," which application is incorporated by reference herein.

This application is related to the following commonly-assigned patent applications: U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK," now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168; U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386; U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038; U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS," now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038; U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK," now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268; U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883; U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038; U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS," which application claims the benefit under 35 U.S.C. Section 119(e) of U.S. Provisional Application Ser. No. 60/588,464; U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271; P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424; U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat.

No. 7,689,238, issued Mar. 30, 2010, which application claims the benefit under 35 U.S.C. Section 119(e) of U.S. Provisional Application Ser. No. 60/705,115; U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265; U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742, 250; U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090; U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521; U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982, 650 and 61/023,042; U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676, 189, issued Mar. 18, 2014, which application claims the benefit under 35 U.S.C. Section 119(e) of U.S. Provisional Application Ser. No. 61/023,332; U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," now U.S. Pat. No. 8,958, 348, issued Feb. 17, 2015, which application claims the benefit under 35 U.S.C. Section 119(e) of U.S. Provisional Application Ser. No. 61/106,689; U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582, 601; U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164, 754 and 61/172,129; U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896; U.S. Utility application Ser. No. 13/039, 635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK," now U.S. Pat. No. 8,369,829, issued Feb. 5, 2013, which application claims the benefit under 35 U.S.C. Section 119(e) of U.S. Provisional Application Ser. No. 61/310,245; U.S. Utility application Ser. No. 13/093, 542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217; U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC)," which application claims the benefit under 35 U.S.C. Section 119(e) of U.S. Provisional Application Ser. No. 61/570,694; U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS," which application claims the benefit under 35 U.S.C. Section 119(e) of U.S. Provisional Application Ser. No. 61/659,292; U.S. Provisional Application Ser. No. 61/682,524; and U.S. Provisional Application Ser. No. 61/705,748; U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC)," now U.S. Pat. No. 9,088,876, issued Jul. 21, 2015, which application claims the benefit under 35 U.S.C. Section 119(e) of U.S. Provisional Application Ser. No. 61/593,485; U.S. Utility application Ser. No. 14/093, 240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," now U.S. Pat. No. 9,137,646, issued Sep. 15, 2015, which application claims the benefit under 35 U.S.C. Section 119(e) of U.S. Provisional Application Ser. No. 61/730,856; P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK," which application claims the benefit under 35 U.S.C. Section 119(e) of U.S. Provisional Application Ser. No. 61/818,109; and U.S. Provisional Application Ser. No. 61/821,975; U.S. Utility application Ser. No. 14/286,427, filed May 23, 2014, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC)," which application claims the benefit under 35 U.S.C. Section 119(e) of U.S. Provisional Application Ser. No. 61/826,895; P.C.T. International Application Serial Number PCT/US2014/047863, filed on Jul. 23, 2014, by Gorachand Kundu, Giridhar K. Boray, Brahmananda R. Vempati, Krishnakant M. Patel, Ravi Ayyasamy, and Harisha M. Negalaguli, entitled "EFFECTIVE PRESENCE FOR PUSH-TO-TALK-OVER-CELLULAR (PoC) NETWORKS," which application claims the benefit under 35 U.S.C. Section 119(e) of U.S. Provisional Application Ser. No. 61/857,363; and U.S. Provisional Application Ser. No. 61/944,168; P.C.T. International Application Serial Number PCT/US15/10617, filed Jan. 8, 2015, by Krishnakant M. Patel, Brahmananda R. Vempati, and Harisha Mahabaleshwara Negalaguli, entitled "OPTIMIZED METHODS FOR LARGE GROUP CALLING USING UNICAST AND MULTICAST TRANSPORT BEARER FOR PUSH-TO-TALK-OVER-CELLULAR (PoC)," which application claims the benefit under 35 U.S.C. Section 119(e) of U.S. Provisional Application Ser. No. 61/924,897; U.S. Utility application Ser. No. 14/639,794, filed Mar. 5, 2015, by Krishnakant M. Patel, Brahmananda R. Vempati, Ravi Ayyasamy, and Bibhudatta Biswal, entitled "PUSH-TO-TALK-OVER-CELLULAR (POC) SERVICE IN HETEROGENEOUS NETWORKS (HETNETS) AND MULTIMODE SMALL CELL ENVIRONMENTS," which application claims the benefit under 35 U.S.C. Section 119(e) of U.S. Provisional Application Ser. No. 61/948,429; P.C.T. International Application Serial Number PCT/US2014/047886, filed on Jul. 23, 2014, by Gorachand Kundu, Giridhar K. Boray, Brahmananda R. Vempati, Krishnakant M. Patel, Ravi Ayyasamy, Harisha Mahabaleshwara Negalaguli, and Ramu Kandula, entitled "RADIO ACCESS NETWORK (RAN) AWARE SERVICE DELIVERY FOR PUSH-TO-TALK-OVER-CELLULAR (PoC) NETWORKS," which application is a continuation-in-part under 35 U.S.C. Section 120 of P.C.T. International Application Ser. No. PCT/US2014/047863; P.C.T. International Application Serial Number PCT/US2015/45951, filed on Aug. 19, 2015, by Krishnakant M. Patel, Brahmananda R. Vempati, and Harisha Mahabaleshwara Negalaguli, entitled "RELAY-MODE AND DIRECT-MODE OPERATIONS FOR PUSH-TO-TALK-OVER-CELLULAR (PoC) USING WIFI TECHNOLOGIES," which application claims the benefit under 35 U.S.C. Section 119(e) of U.S. Provisional Application Ser. No. 62/039,272; P.C.T. International Application Serial Number PCT/US2015/56712, filed on Oct. 21, 2015, by Krishnakant M. Patel, Ramu Kandula, Brahmananda R. Vempati, Pravat Kumar Singh, and Harisha Mahabaleshwara Negalaguli, entitled "SYSTEM FOR INTER-COMMUNICATION BETWEEN LAND MOBILE RADIO AND PUSH-TO-TALK-OVER-CELLULAR SYSTEMS," which application claims the benefit under 35 U.S.C. Section 119(e) of U.S. Provisional Application Ser. No. 62/066,533; P.C.T. International Application Serial Number PCT/US2015/58088, filed on Oct. 29, 2015, by Krishnakant M. Patel, Brahmananda R. Vempati, Bibhudatta Biswal, Ravi Ayyasamy, Harisha Mahabaleshwara Negalaguli, and Ramu Kandula, entitled "METHODS TO LEVERAGE WEB REAL-TIME COMMUNICATION FOR IMPLEMENTING PUSH-TO-TALK SOLUTIONS," which application claims the benefit under 35 U.S.C. Section 119(e) of U.S. Provisional Application Ser. Nos. 62/072,135 and 62/117,575; P.C.T. International Application Serial Number PCT/US2015/xxxxxx, filed on Nov. 3, 2015, by Krishnakant M. Patel, Ramu Kandula, Brahmananda R. Vempati, Harisha Mahabaleshwara Negalaguli, and Ramu Kandula, entitled "METHOD TO PROVIDE DYNAMIC QoS FOR PoC USING Rx INTERFACE," which application claims the benefit under 35 U.S.C. Section 119(e) of U.S. Provisional Application Ser. No. 62/074,386; P.C.T. International Application Serial Number PCT/US2015/xxxxxx, filed on Nov. 3, 2015, by Krishnakant M. Patel, Ramu Kandula, Brahmananda R. Vempati, Harisha Mahabaleshwara Negalaguli, and Bharat Ram Setti Nagaswamy Srinivasan, entitled "METHOD FOR MULTIPLEXING MEDIA STREAMS TO OPTIMIZE NETWORK RESOURCE USAGE FOR PUSH-TO-TALK-OVER-CELLULAR (PoC) SERVICE," which application claims the benefit under 35 U.S.C. Section 119(e) of U.S. Provisional Application Ser. No. 62/074,472 and U.S. Provisional Application Ser. No. 62/111,409; all of which applications are incorporated by reference herein.

BACKGROUND

1. Field of the Invention

This invention relates in general to advanced messaging services in wireless communications networks, and more specifically, to an architecture framework to realize Push-to-X services using cloud-based storage services.

2. Description of Related Art

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), as well as other AVS functions, such as Push-to-Conference (P2C) or Instant Conferencing (IC), and advanced messaging services (AMS), such as Push-to-Message (P2M), etc., are described in the co-pending and commonly-assigned patent applications cross-referenced above and incorporated by reference herein. These AVS and AMS functions have enormous revenue earnings potential for wireless communications systems, such as cellular networks, wireless data networks and IP networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G/4G/LTE (3$^{rd}$ Generation/ 4$^{th}$ Generation/Long Term Evolution), etc.

Nonetheless, there is a need in the art for improvements to the methods and systems for delivering the advanced voice and messaging services, such as PoC/PTT, that comply with both existing and emerging wireless standards and yet provide superior user experiences. For example, many existing implementations of PoC/PTT do not support Push-to-X services using cloud-based storage services. The present invention, on the other hand, satisfies the need for Push-to-X services.

SUMMARY OF THE INVENTION

To overcome the limitations in the prior art described above, and to overcome other limitations that will become apparent upon reading and understanding the present specification, the present invention discloses an architecture framework to realize Push-to-X services using cloud-based storage services. One or more messaging servers interface to one or more wireless communications networks to perform advanced messaging services for one or more mobile units therein, wherein the advanced messaging services comprise Push-to-X messages. Both the messaging servers and the mobile units that use the advanced messaging services communicate with each other using control messages transmitted across the wireless communications networks.

A Push-to-X message may include a short text message contained wholly within the Push-to-X message, or the Push-to-X message may include one or more attachments that comprise multimedia contents, files, or location information, which are stored on one or more storage servers that interface to the wireless communications networks, wherein the control messages communicated between the messaging servers and the mobile units identify a location for retrieving the attachments that are stored on the storage servers.

The messaging servers and the mobile units communicate with each other using a Session Initiation Protocol (SIP), while the storage servers and the mobile units communicate with each other using a Hypertext Transport Protocol (HIIP). The attachments are uploaded to or downloaded from the storage servers using Uniform Resource Locaters (URLs).

The Push-to-X messages may be sent to a single mobile unit identified by a Mobile Directory Number (MDN), a group of mobile units identified by a list of MDNs, or a group of mobile units identified by a Uniform Resource Identifier (URI).

A network-to-network interface (NNI) gateway is used to transport the messages and their attachments between foreign systems.

BRIEF DESCRIPTION OF THE DRAWINGS

Referring now to the drawings in which like reference numbers represent corresponding parts throughout.

DETAILED DESCRIPTION OF THE INVENTION

Figure 1:
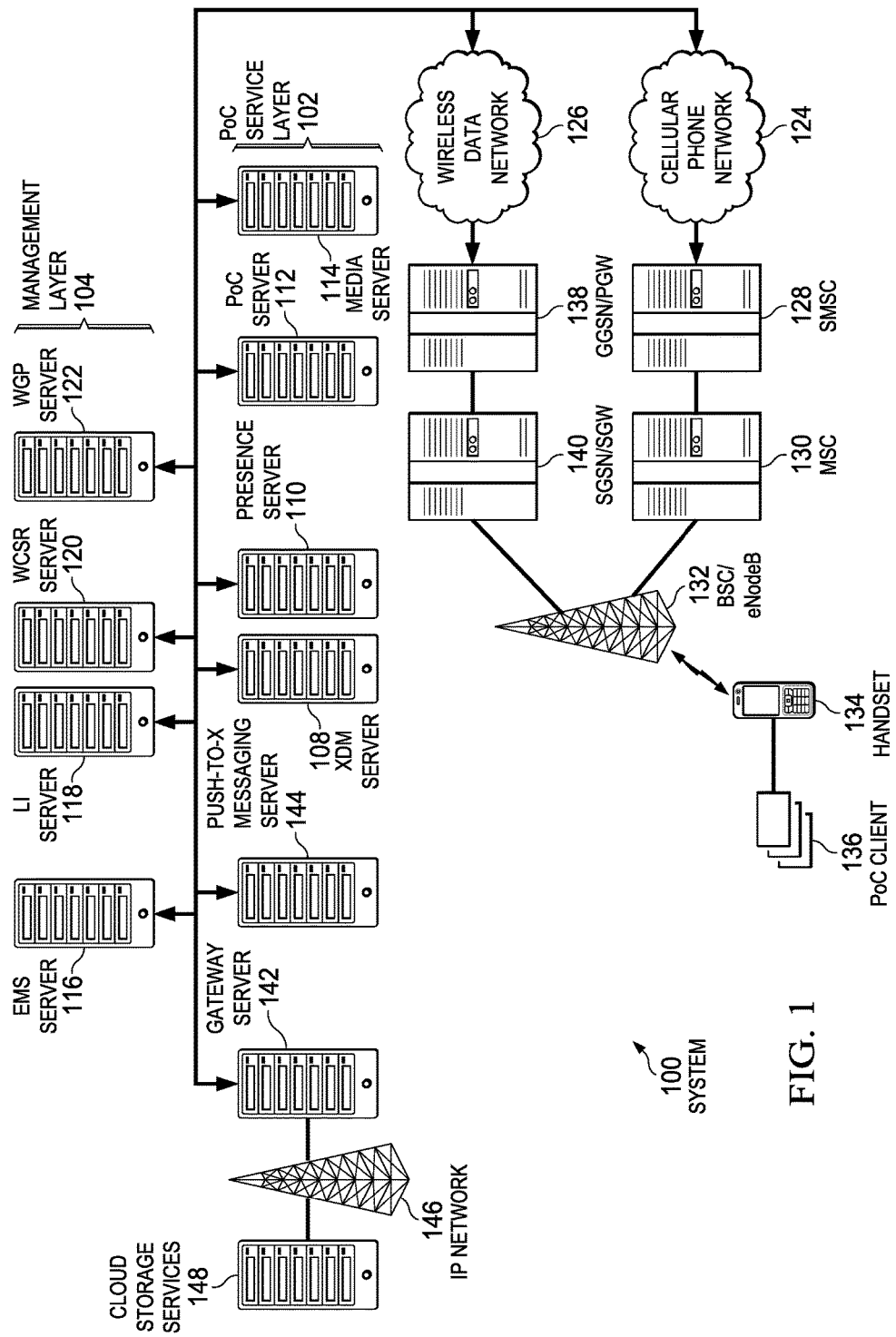
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| DTLS | Datagram Transport Layer Security |
| FQDN | Fully Qualified Domain Name |
| GPRS | General Packet Radio Service |
| GSM | Global System for Mobile communications |
| HTTP | Hypertext Transport Protocol |

-continued

| Acronym | Description |
| --- | --- |
| HTTPS | Secure Hypertext Transport Protocol |
| ICE | Interactive Connectivity Establishment |
| IMSI | International Mobile Subscriber Identity |
| IP | Internet Protocol |
| IPA | Instant Personal Alert |
| MBCP | Media Burst Control Protocol |
| MBMS/eMBMS | Multimedia Broadcast Multicast Services |
| MCA | Missed Call Alert |
| MCC | Mobile Country Code |
| MDN | Mobile Directory Number |
| MIME | Multipart Internet Mail Extensions |
| MNC | Mobile Network Code |
| MS-ISDN | Mobile Station International Subscriber Directory Number |
| NAT | Network Address Translation |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTP | Realtime Transport Protocol |
| SDP | Session Description Protocol |
| SGW | Serving GateWay |
| SIM | Subscriber Identity Module |
| SIP | Session Initiation Protocol |
| SMMP | Short Message peer-to-peer Protocol |
| SMS | Small Message Service |
| SRTCP | Secure Real-time Transport Control Protocol |
| SRTP | Secure Real-time Transport Protocol |
| SSID | Service Set Identifier |
| SSL | Secure Sockets Layer protocol |
| SSRC | Synchronization SouRCe |
| STUN | Traversal Utilities for NAT |
| TLS | Transport layer security protocol |
| TURN | Traversal Using Relay NAT |
| UDP | User Datagram Protocol |
| URI | Uniform Resource Identifier |
| VoIP | Voice-over-IP |
| WebRTC | Web Real-Time Communication |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1-1 Call Session | A feature enabling a User to establish a Call Session with another User. |
| Ad Hoc Group Session | A Group Session established by a User to one or more Users listed on the invitation. The list includes Users or Groups or both. |
| Answer Mode | A Client mode of operation for the terminating Call Session invitation handling. |
| Controlling PoC Function | A function implemented in a PoC Server, providing centralized PoC/PTT Call Session handling, which includes media distribution, Talk Burst Control, Media Burst Control, policy enforcement for participation in the Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC/PTT service to the User. |
| Instant Personal Alert | A feature in which a User sends a SIP based instant message to another User requesting a 1-1 Call Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signaling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC/PTT Call Session handling, which includes policy enforcement for incoming PoC Call Sessions and relays Talk Burst Control and Media Burst Control messages between the PoC/PTT Client and the PoC Server performing the Controlling PoC Function. The Participating PoC Function may also relay RTP Media between the PoC/PTT Client and the PoC Server performing the Controlling PoC Function. |
| PoC/PTT Client | A functional entity that resides on the User Equipment that supports the PoC/PTT service. |
| Pre-Arranged Group Identity | A SIP URI identifying a Pre-Arranged Group. A Pre-Arranged Group Identity is used by the PoC/PTT Client, e.g., to establish Group Sessions to the Pre-Arranged Groups. |
| Pre-Arranged Group | A persistent Group. The establishment of a PoC/PTT Call Session to a Pre-Arranged Group results in the members being invited. |

-continued

| Term | Description |
| --- | --- |
| Pre-Established Session | The Pre-Established Session is a SIP Session established between the PoC/PTT Client and its Home PoC Server. The PoC/PTT Client establishes the Pre-Established Session prior to making requests for PoC/PTT Call Sessions to other Users. To establish a PoC/PTT Call Session based on a SIP request from the User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| PoC/PTT Client | A functional entity that resides on the User Equipment that supports the PoC/PTT service. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2 System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 executing a PoC Client 136. A handset 134 is also referred to as a mobile unit, mobile station, mobile phone, cellular phone, etc. and may comprise any wireless and/or wired user device. The wireless data network 126, depending on its type, e.g., GPRS or 4G/LTE, includes one or more Gateway GPRS Support Nodes (GGSNs) or Packet Gateways (PGWs) 138 and Serving GPRS Support Nodes (SGSNs) or Serving GateWays (SGWs) 140, which also communicate with customer handsets 134 via BSCs or eNodeBs 132.

In one embodiment of the present invention, the PoC Service Layer 102 and Management Layer 104 are also connected to one or more Gateway Servers 142 and one or more includes a Push-to-X Messaging Servers 144, wherein the Gateway Servers 142 are coupled to one or more external IP networks 146, such as the Internet or WiFi networks, in order to communicate with one or more Cloud Storage Services 148, as well as handsets 134 and PoC Clients 136 that are WiFi-enabled. These components are used to implement advanced messaging services, namely Push-to-X messages, for the PoC Clients 136 in the PoC system 100, as described in more detail below.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN/PGW 138 transfers IP packets between the PoC Client 136 and the various servers:
  SIP/IP signaling messages between the PoC Server 112 and PoC Client 136 for control traffic exchange (i.e., control packets) for PoC call sessions.
  RTP/IP, RTCP/IP and MBCP/IP packets between the Media Server 114 and PoC Client 136 for bearer traffic exchange (i.e., voice packets) for PoC call sessions.
  SIP/IP signaling messages between the Presence Server no and PoC Client 136 for presence information.
  XCAP/HTTP/IP and SIP/IP signaling between the XDM Server 108 and PoC Client 136 for document management.

The SMSC 128 handles authentication:
  The XDM Server 108 communicates with the SMSC 128 via SMPP/IP for receiving the authentication code required for PoC Client 136 activation from the handset 134.

2.3 IP Network

The PoC Service Layer 102 also interacts with the following entities on the IP network 146:
  The Gateway Server 142 transfers IP packets between the PoC Clients 136 and the various servers:
    SIP/IP signaling messages between the PoC Server 112 and PoC Clients 136 for control traffic exchange (i.e., control packets).
    RTP/IP, RTCP/IP and MBCP/IP packets between the Media Server 114 and PoC Clients 136 for bearer traffic exchange (i.e., voice or data packets).
    SIP/IP signaling messages between the Presence Server no and PoC Clients 136 for presence information.
    XCAP/HTTP/IP and SIP/IP signaling between the XDM Server 108 and PoC Clients 136 for document management.
    SIP/IP signaling messages between the XDM Server 108 and PoC Clients 136 for receiving the authentication code required for PoC Clients 136 activation.

2.4 PoC Service Layer Elements

As noted above, the PoC Service Layer 102 is comprised of the following elements:
  PoC Server 112,
  Media Server 114,
  Presence Server 110,
  XDM Server 108,
  Gateway Server 142, and
  Push-to-X Messaging Server 144.

These elements are described in more detail below.

2.4.1 PoC Server

The PoC Server 112 handles the PoC/PTT call session management and is the core for managing the PoC/PTT services for the PoC Clients 136 using SIP protocol. The PoC Server 112 implements a Control Plane portion of Controlling and Participating PoC Functions. A Controlling PoC Function acts as an arbitrator for a PoC/PTT session and controls the sending of control and bearer traffic by the PoC Clients 136. A Participating PoC Function relays control and bearer traffic between the PoC Clients 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC/PTT session. The Media Server 114 also supports the Participating PoC Function by relaying the voice packets between the PoC Clients 136 and the Media Server 114 supporting the Controlling PoC Function. The Media Server 114 also handles packets sent to and received from the PoC Clients 136 for floor control during PoC/PTT call sessions.

2.4.3 Presence Server

The Presence Server no implements a presence enabler for the PoC/PTT service. The Presence Server no accepts, stores and distributes Presence Information for Presentities, such as PoC Clients 136.

The Presence Server no also implements a Resource List Server (RLS), which accepts and manages subscriptions to Presence Lists. Presence Lists enable a "watcher" application to subscribe to the Presence Information of multiple Presentities using a single subscription transaction.

The Presence Server no uses certain XDM functions to provide these functions, which are provided by XDM Server 108.

2.4.4 XDM Server

The XDM Server 108 implements an XDM enabler for the PoC/PTT service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 Gateway Server

The Gateway Server 142 implements a interworking solution for communication from the PoC system 100 to the Cloud Storage Services 148 and WiFi-enabled handsets 134 via one or more IP networks 146. Additional details concerning these functions are described in more detail below.

2.5 Management Layer Elements

As noted above, the Management Layer 104 is comprised of the following elements:
  Element Management System (EMS) Server 116,
  Lawful Intercept (LI) Server 118,
  Web Group Provisioning (WGP) Server 122, and
  Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC/PTT services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC/PTT contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
  Create Subscriber account,
  Update Subscriber account,
  Delete Subscriber account,
  Mobile number change command,
  View Subscriber details (MDN, Group, Group members), Manage Corporate Accounts,
Add CSR account,
Delete CSR account.

3 System Functions

The following sections describe various functions performed by each of the components of the system architecture.

3.1 PoC Service Layer
3.1.1 PoC Server

The PoC Server 112 controls PoC/PTT call sessions, including 1-1, Ad Hoc and Pre-Arranged call sessions. The PoC Server 112 also controls Instant Personal Alerts (IPAs) and Missed Call Alerts (MCAs).

The PoC Server 112 expects the PoC Clients 136 to setup "pre-established sessions" at the time of start up and use these sessions to make outgoing PoC/PTT calls. The PoC Server 112 also uses pre-established sessions to terminate incoming PoC/PTT calls to the PoC Clients 136. The PoC Clients 136 may be setup in auto-answer mode by default. The use of pre-established sessions and auto-answer mode together allow for faster call setup for PoC/PTT call sessions.

The PoC Server 112 allocates and manages the media ports of the Media Servers 114 associated with each SIP INVITE dialog for pre-established sessions and controls the Media Servers 114 to dynamically associate these ports at run time for sending RTP packets during PoC/PTT call sessions. Media ports are assigned and tracked by the PoC Server 112 at the time of setting up pre-established sessions. The PoC Server 112 instructs the Media Server 114 to associate the media ports of various subscribers dynamically into a session when a PoC/PTT call is originated and this session is maintained for the duration of the call. The PoC Server 112 also controls the floor states of the various participants in a PoC/PTT call session by receiving indications from the Media Servers 114 and sending appropriate requests back to the Media Servers 114 to send MBCP messages to the participants in the PoC/PTT call. The Media Server 114 uses the media ports association and current talker information to send the RTP packets from the talker's media port onto the listeners' media ports.

In addition, the PoC Server 112 handles the incoming and outgoing Instant Personal Alerts and Missed Call Alerts by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136, as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from Clients 136, 148, 150 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.3 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains separate subscriptions for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.4 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.5 Gateway Server

The Gateway Server 142 performs interworking for the PoC system 100 by communicating with the Cloud Storage Services 148 via one or more IP networks 146. In addition, the PoC Clients 136 may communicate with the Gateway Server 142 and the Cloud Storage Services 148 via one or more IP networks 146.

The Gateway Server 142 and/or PoC Client 136 sets up one or more connections with the Cloud Storage Services 148 using the configured Fully Qualified Domain Name (FQDN), or absolute domain name, of the Cloud Storage Services 148, which may be publicly exposed to the IP network 146. Secure transport protocols may (or may not) be used for the connections across the IP network 146. For example, the Gateway Server 142 and/or PoC Client 136 may use the Transport Layer Security (TLS) and/or Secure Sockets Layer (SSL) protocols for encrypting information transmitted over the connections with the Cloud Storage Services 148.

In such an embodiment, all SIP signaling and voice data (RTP and RTCP) would be tunneled over the SSL/TLS connections. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

The Gateway Server 142 terminates the SSL/TLS connections and aggregates or dis-aggregates the resultant traffic to the appropriate Servers 108, 110, 112, 114, 116, 118, 120, 122 and 144. Specifically, the Gateway Server 142 acts as an intelligent traffic distributor for SIP signaling and RTP/RTCP traffic by forwarding the traffic to the appropriate Servers 108, 110, 112, 114, 116, 118, 120, 122 and 144, depending on the message types and the availability of the Servers 108, 110, 112, 114, 116, 118, 120, 122 and 144. Consequently, the Gateway Server 142 is a single point-of-contact for all traffic to and from the IP network 146.

3.2 Management Layer 3.2.1 EMS Server

The EMS Server 116 is the central management entity in the system and includes the following modules:
- A central application where all management business logic resides.
- A web server for serving the network operator's internal users. A corresponding client provides a user interface for viewing fault, configuration, performance and security information.
- A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.
- Create Subscriber account,
- Update Subscriber account,
- Delete Subscriber account,
- Mobile number change command,
- Forced synchronization of a Subscriber,
- Deactivate a Subscriber account,
- Reactivate a Subscriber account,
- View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:
- Group management,
- Contact management, and
- Associations between corporations.

With regard to group management, the CAT of the WGP Server 122 includes the following operations:
- Create, Update, Delete and View Corporate Groups,
- Add, Update, Delete and View Members of a Corporate Group,
- Manage Subscribers,
- Activate and Deactivate a Corporate Subscriber,
- Change a Subscriber type from "Corporate" to "Corporate And Public", and vice versa,
- Restrict Availability, i.e., do not allow subscriber to change their presence status, and
- Manage number porting or name change via phone assignment.

With regard to contact management, the CAT of the WGP Server 122 includes the following operations:
- Phone list management,
- N×N Contact Add (e.g., N contacts may be members of N groups),
- Add, Update, Delete and View Contacts for a specific subscriber, and
- Export and Import contacts at both the subscriber and corporate level.

With regard to associations between corporations, the CAT of the WGP Server 122 includes the following operations:
- Corporate Associations Attributes,
- Association Name,
- Association ID,
- Association Mode (e.g., One-way, Two-way), and
- Restricted List.

Once the association is created and accepted, corporate administrators can create contacts and groups using the association policies. Administrators from other corporations can view the contacts, and may or may not have the capability to add, update or delete the contacts.
- Corporate ID associated per corporate subscriber,
- Central management of corporate subscribers, groups, and contacts,
- Intercorporate associations, including contacts and whitelists,
- Phone list management (e.g., N×N contact add),
- Restrict Availability, and
- Import and Export contacts at both the subscriber and corporate level.

Note that, if the association is deleted, then usually all intercorporate contacts and group members will be deleted.

3.3 PoC Client

The following features are supported by the PoC Clients 136:
- PoC calls, Instant Personal Alert (IPA), and Missed Call Alert (MCA),
- Presence, and
- Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server no as a "watcher" of all contacts in the PoC Client 136 and updates the user interface of the PoC Client 136 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the PoC Client 136 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged calls. The client module also supports sending and receiving Instant Personal Alerts (IPA).

4 State Diagram for a PoC/PTT Call Session

Figure 2:
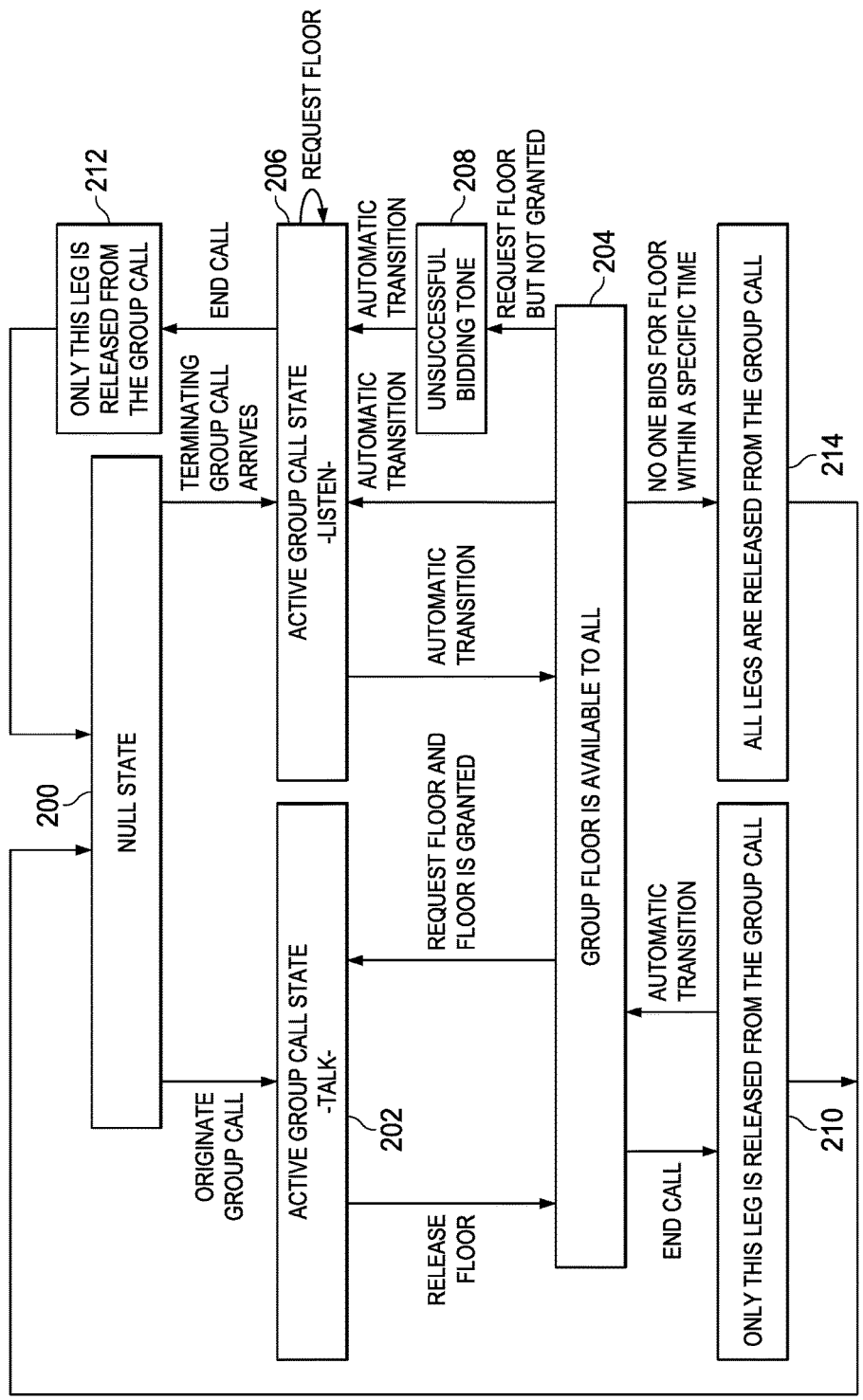
FIG. 2 is a state diagram that illustrates the operation of a PoC/PTT call session according to one embodiment of the present invention.

FIG. 2 is a state diagram that illustrates the operation of a PoC/PTT call session according to one embodiment of the present invention.

State 200 represents a PoC Client 136 in a NULL state, i.e., the start of the logic. A transition out of this state is triggered by a user making a request to originate a PoC/PTT call, or by a request being made to terminate a PoC/PTT call. A request to originate a PoC/PTT call is normally made by pressing a PoC/PTT button, but may be initiated in this embodiment by dialing or entering some sequence of one or more numbers on the handset 134 or other device that are interpreted by the PoC Server 112, by pressing one or more other keys on the handset 134 or other device that are interpreted by the PoC Server 112, by speaking one or more commands that are interpreted by the PoC Server 112, or by some other means.

State 202 represents the PoC Client 136 in an active group call state, having received a "floor grant" (permit to speak). In this state, the user receives a chirp tone that indicates that the user may start talking. The user responds by talking. The PoC Client 136 uses the reverse traffic channel to send voice frames to the Media Server 114, and the Media Server 114 switches voice frames only in one direction, i.e., from talker to one or more listeners, which ensures the half-duplex operation required for a PoC/PTT call.

State 204 represents the group "floor" being available to all members of the group. When the talking user signals that the floor is released, the floor is available to all group members. The signal to release the floor is normally made by releasing the PoC/PTT button, but may be performed in this embodiment by voice activity detection, e.g., by not speaking for some time period (which is interpreted by the PoC Server 112 as a release command). All members of the group receive a "free floor" tone or other signal. A user who requests the floor first (in the "free-floor" state), for example, is granted the floor, wherein the system 100 sends a chirp tone to the successful user. The signal to request the floor is normally made by pressing the PoC button, but may be performed in this embodiment by voice activity detection, e.g., by speaking for some time period (which is interpreted by the PoC Server 112 as a request command).

State 206 represents the PoC Client 136 being in an active group call state. In this state, the user is listening to the group call. If a non-talking user requests the floor in the active group call state, the user does not receive any response from the system 100 and remains in the same functional state. As noted above, the signal to request the floor is normally made by pressing the PoC/PTT button, but may be performed in this embodiment by voice activity detection, e.g., by speaking for some time period (which is interpreted by the PoC Server 112 as a request command).

State 208 represents a user receiving an "unsuccessful bidding" tone, after the user has requested the floor, but was not granted the floor, of the group call. The user subsequently listens to the voice message of the talking user.

Non-talking users (including the talking user who must release the floor to make it available for others) can request the system 100 to end their respective call legs explicitly. State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 Push-to-X Services Using Cloud-Based Storage Services

5.1 Introduction

The Push-to-X feature of the present invention allows a PTT subscriber to send a message with short text, multimedia contents, large (text) files, and location information, to other PTT subscribers. The multimedia contents can include images, videos, audio, and other files. The feature includes store-and-forward functions and delivery receipts to ensure that the recipient has the best chance to receive the message. Delivery receipts and read receipts are provided to the sender with confirmation that the message was delivered and read by the recipients.

5.2 Push-to-X Overview

A Push-to-X message typically is comprised of a message and an attachment. The attachment can be multimedia contents, (e.g., image, video, audio), or a large text file (e.g., PDF), and/or location information.

The message itself may include short text, which may or may not eliminate the need for an attachment.

For fleet members, the location information is automatically included with the message, and is typically viewable only by the dispatcher. If the user wants to send his location to another user, he must explicitly attach his location as an attachment.

The Push-to-X feature allows PTT subscribers/dispatchers to use instant messaging, location and multimedia-content sharing with other PTT subscribers in 1-to-1 and group communications. A Push-to-X message can be sent to single user (1-to-1) or multiple users (pre-defined groups, ad hoc groups and dynamic groups) with reply, reply to all, and forward functions supported when message is received by recipient.

The Push-to-X feature also supports store-and-forward mechanism to allow delivery to offline subscribers later when they become online.

5.3 Push-to-X Architecture

Figure 3:
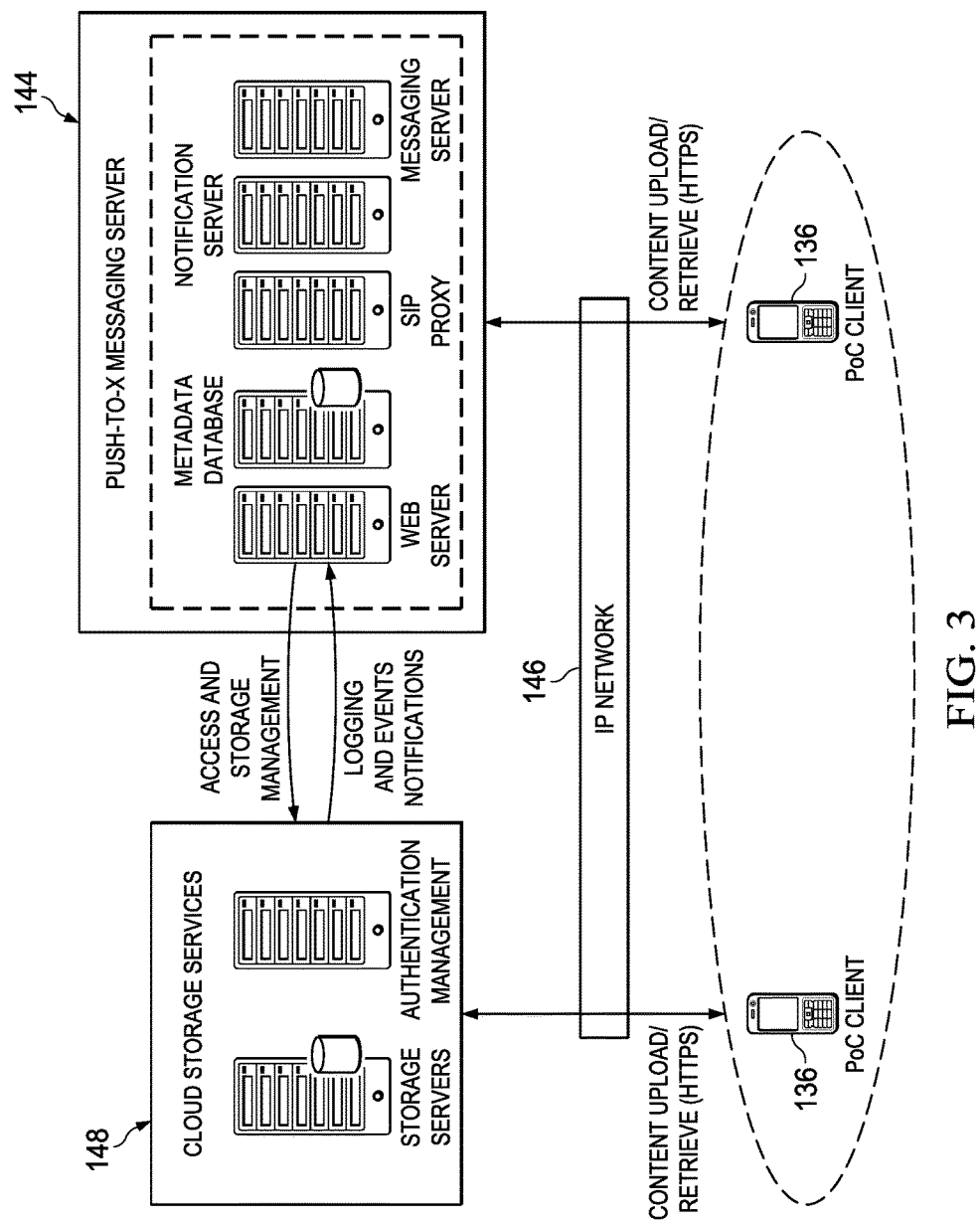
FIG. 3 is a diagram that depicts the components and connectivity between components necessary for implementing a Push-to-X feature in a Push-to-Talk system, according to one embodiment of the present invention.

FIG. 3 is a diagram that depicts the components and connectivity between components necessary for implementing the Push-to-X feature in the PoC system 100, according to one embodiment of the present invention. The Push-to-X Messaging Server 144 includes Web Server, Metadata Database (DB), SIP Proxy, Notification Server and Messaging Server functions, which are described in more detail below. The Cloud Storage Services includes one or more Storage Servers and Authentication Management functions, which are described in more detail below. The Push-to-X Messaging Server 144 and Cloud Storage Services 148 interact for access and storage management, as well as logging and events notifications.

The Push-to-X feature is based on HTTP and SIP client-server protocols. The Push-to-X Messaging Server 144 uses SIP for controlling the Push-to-X messages, wherein any push-based notification can be used to carry Push-to-X messages to recipients. The Cloud Storage Services 148 use HTTP for content storage and transfer of all attachments sent in Push-to-X messages, wherein the Cloud Storage Services 148 may comprise an in-house service or a service operated by a third party vendor.

The Push-to-X feature provides the following functions for PTT subscribers:

The ability to create temporary upload and download URLs to save and retrieve attachments on the Cloud Storage Service 148.

The ability to specify different validity durations for each temporary URL.

The encryption of stored files, including use of the Federal Information Processing Standard (FIPS).

Access control.

Attachments are uploaded and retrieved directly to/from the Cloud Storage Services 148. As a result, the network bandwidth and server capacity of the PoC system 100 itself may not be utilized for upload/download operations.

The Push-to-X Messaging Server 144 acts as control-plane and attachment upload/download/storage is left to the Cloud Storage Services 148.

The following functions are perform by the Push-to-X Messaging Server 144 acting as the control-plane:

Message signaling (to, from, type of message, etc.).

Remotely manage the attachments in the Cloud Storage Services 148.

Create and manage access to the attachments for individual PoC Client 136 retrieval.

Push notifications to the PoC Clients 136 regarding the storage of attachments.

Retry and offline delivery mechanisms of messages and attachments.

Provide controlled access to the Push-to-X messages and attachments.

All non-real time services, such as IPAs, MCAs and other notifications, can be carried over the messaging infrastructure.

The Push-to-X solution may utilize third-party cloud-based trans-coding services for media type conversion (such as SD video, HD video, MP3 audio, etc.).

If there are some formats of attachments that require specific trans-coding, then the PoC system 100 is in the upload path (i.e., via the Gateway Server 142 and the Push-to-X Messaging Server 144), and can trans-code that attachment prior to it being uploaded to the Cloud Storage Services 148.

5.4 Push-to-X Call Flows 5.4.1 Messages with Short Text

Figure 4:
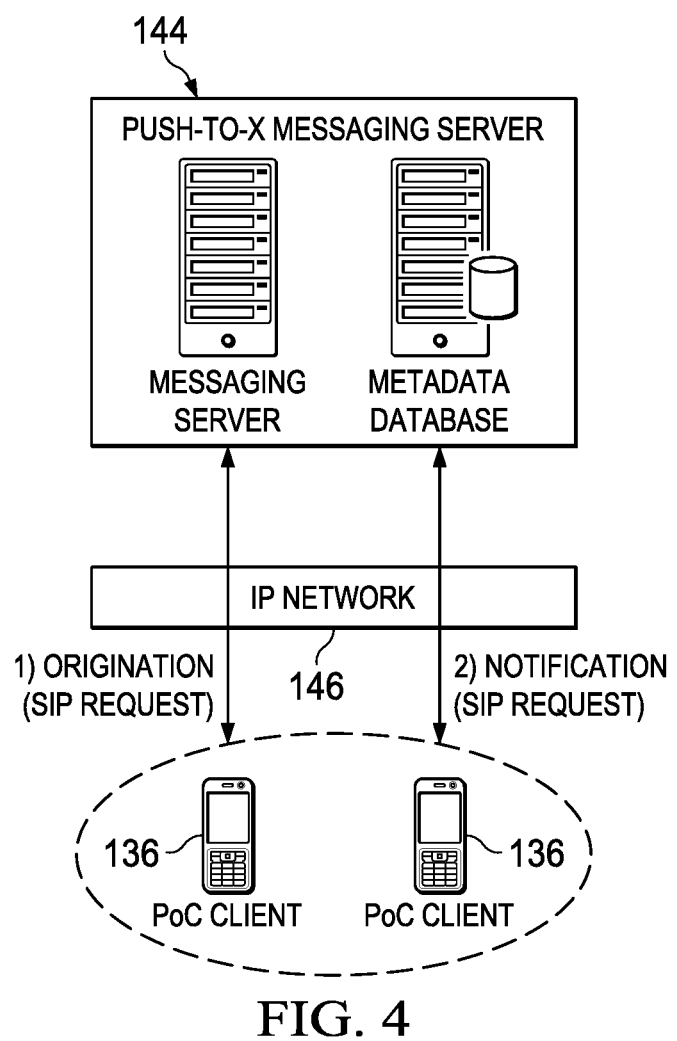
FIG. 4 is a diagram that illustrates a Push-to-X message origination, wherein the message is a short text message contained wholly within the Push-to-X message and not in an attachment, according to one embodiment of the present invention.

FIG. 4 is a diagram that illustrates a Push-to-X message origination, wherein the message is a short text message contained wholly within the Push-to-X message and not in an attachment, according to one embodiment of the present invention.

In Step 1), the originating PoC Client 136 communicates with the Push-to-X Messaging Server 144 using a SIP request to send the Push-to-X message for delivery to the intended recipients.

The SIP request includes a unique option tag or header value to identify the request as a send request for a Push-to-X message. The SIP request also includes all the required Push-to-X metadata along with the short text message, wherein the metadata includes:

a. Message ID.
b. Sender.
c. Recipient list.
d. Short text message.
e. Current GPS location (latitude and longitude values) if auto-attached by a fleet member's PoC Client 136 or attached by a user.
f. A flag indicating whether this is an urgent message or not.

A successful SIP response is sent by the Push-to-X Messaging Server 144 to the originating PoC Client 136 if the message transmission is successful. The successful SIP response includes the following information:

a. Message ID for correlation.
b. Message sent date and time, which is the timestamp at which the Push-to-X Messaging Server 144 received the request.
c. Message expiry date and time, which is calculated by the Push-to-X Messaging Server 144 using the request received timestamp and message configuration.

A failure SIP response is sent by the Push-to-X Messaging Server 144 to the originating PoC Client 136 if the message origination has failed for any reason and indicates the error through an appropriate SIP response code:

a. A SIP 410 response is sent when the recipient (1-to-1) or group URI (pre-arranged group) is not found on PoC system 100.
b. A SIP 480 response is sent when none of the recipients (1-to-1, ad hoc group, pre-arranged group, etc.) are capable of receiving a Push-to-X message. Note that this includes the situations where recipients are using older PoC Clients 136, or when the Push-to-X service is not enabled for the PoC Client 136, or when the sender is not authorized to send a Push-to-X message to any of the recipients (e.g., all recipients are corporate-only subscribers from another corporation).

In Step 2) Notification, the Push-to-X Messaging Server 144 communicates with the recipient PoC Client(s) 136 using a SIP request for directly delivering the Push-to-X message that contains the short text message.

5.4.2 Messages with Multimedia Contents

Figure 5:
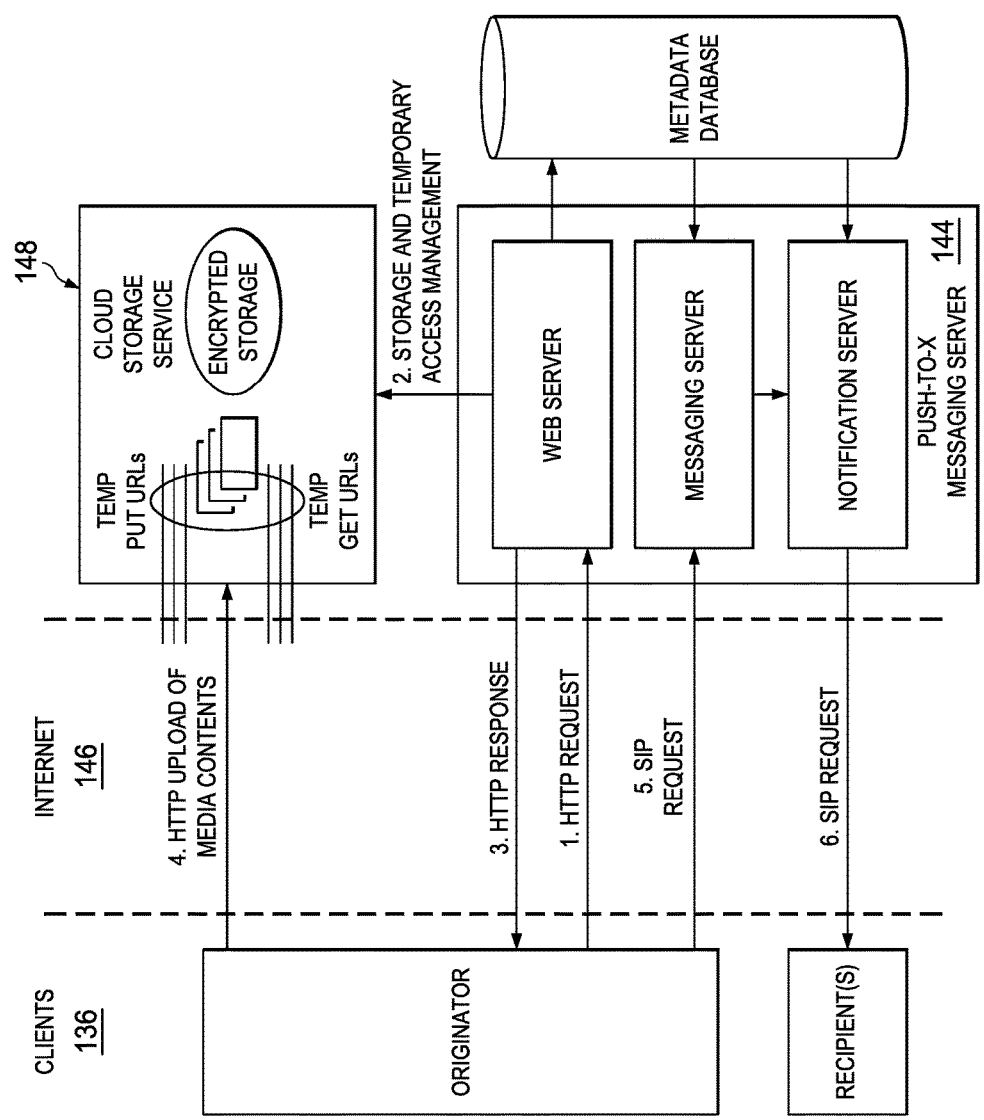
FIG. 5 is a diagram that illustrates a Push-to-X message origination, wherein the message includes multimedia contents as an attachment, according to one embodiment of the present invention.

FIG. 5 is a diagram that illustrates a Push-to-X message origination, wherein the message includes multimedia contents as an attachment, according to one embodiment of the present invention. In this context, the multimedia contents may comprise:

Images,
Video,
Audio (such as voice messages), and
Files.

The call flow for multimedia messages involves following steps:

1. The PoC Client 136 starts a signaling session with the Web Server function of the Push-to-X Messaging Server 144 to initiate a Push-to-X message origination with multimedia contents as an attachment over HTTP. The PoC Client 136 sends the Web Server the following metadata for storage in the Metadata DB:

a. Message ID, which is generated by the PoC Client 136 (e.g., MDN+timestamp).
b. Sender, which is retrieved from the "From" header of HTTPS request. The Web Server verifies that the MDN specified in a "From" header matches the user name specified in an "Authorization" header.
c. List of recipients, which may be a single MDN, or a list of MDNs, or a group URI.
d. Text message, if specified by user. Note that, for short text messages, an HTTP upload may not be required, whereas for multimedia contents, including large text messages, an HTTP upload may be required.

e. Current GPS location (latitude/longitude values) if auto-attached by a fleet member or manually attached by a user.

f. Flag indicating whether this is an urgent message or not. Note that urgent messages may contain only text and no attachment or location.

g. Flag indicating whether an attachment will be uploaded.

h. File size of attachment if attachment flag is true.

i. File name of attachment if attachment flag is true.

j. File type (image/audio/video/file) of attachment if attachment flag is true.

The Push-to-X Messaging Server 144 may include additional metadata in the Metadata DB:

a. Message ID specified by the PoC Client 136 in the request (this can be used for correlation and updating a history entry). Note that, if an entry in an "outbox" table already exists with the same Message ID as specified by the PoC Client 136 in the request, the Web Server may reject the request with an HTTPS 409 Conflict response.

b. Upload URL for file attachment, if the attachment flag is set to true in the request.

2. The Web Server obtains a temporary HTTP URL at the Cloud Storage Services 148 for the multimedia contents upload.

3. The Web Server provides the temporary HTTP URL for the multimedia contents upload to the PoC Client 136.

4. The PoC Client 136 uploads the multimedia contents directly to the Cloud Storage Services 148 using the temporary HTTP URL.

5. Once the multimedia contents upload is complete, the PoC Client 136 initiates a SIP request with the Messaging Server of the Push-to-X Messaging Server 144. Upon receiving a "send message" SIP request, the Messaging Server checks whether there is at least one valid recipient who is capable of receiving the Push-to-X message.

Also, once the message is retrieved, the Push-to-X Messaging Server 144 interworks with the Cloud Storage Services 148 to disable the temporary HTTP URL, so that the URL is accessible only for brief period of time. This helps to provide additional security of the multimedia attachments. This behavior is configurable in the Push-to-X Messaging Server 144.

If the message cannot be delivered, the Messaging Server returns an appropriate error response. Otherwise, if the message can be delivered to at least one recipient, the Messaging Server takes the following actions:

a. Mark the message as "to be sent" in an "outbox" table in the Metadata DB.

b. Note the timestamp at which the "send message" SIP request was received and also store it in the "outbox" table.

c. Calculate the message expiry time and store it in the "outbox" table.

d. If a request option tag/header value indicates the Push-to-X message has only short text, then the Messaging Server first stores the message metadata in the "outbox" table, marked as "to be sent," and then continues with the Push-to-X message delivery.

e. If the request option tag/header value indicates the Push-to-X message has a multimedia contents attachment, then the Messaging Server retrieves the metadata corresponding to the message ID from the "outbox" table in the Metadata DB, and marks it as "to be sent" in the "outbox" table.

f. Then, the Messaging Server signals the Notification Server to continue with the Push-to-X message delivery.

6. In response, the Notification Server of the Push-to-X Messaging Server 144 starts processing the message to be delivered to the recipient PoC Client(s) 136 via SIP requests. Specifically, the Notification Server takes the following steps for delivering the Push-to-X message:

a. The Notification Server extracts the list of unique recipient MDNs to whom the sender is authorized to send the message and who are capable of receiving the message.

b. For each of these recipients, the Notification Server first inserts the metadata into a "pending messages" table in the Metadata DB irrespective of whether the message can be directly delivered over SIP (short text-only) or the PoC Client 136 has to be notified to retrieve the multimedia contents.

c. The Notification Server then deletes message metadata from the "outbox" table.

In the above, note that the signaling from the PoC Client 136 to the Push-to-X Messaging Server 144 is very similar to the text messaging flows for the Push-to-X feature shown in FIG. 4.

5.4.3 Multimedia Message Delivery

Figure 6:
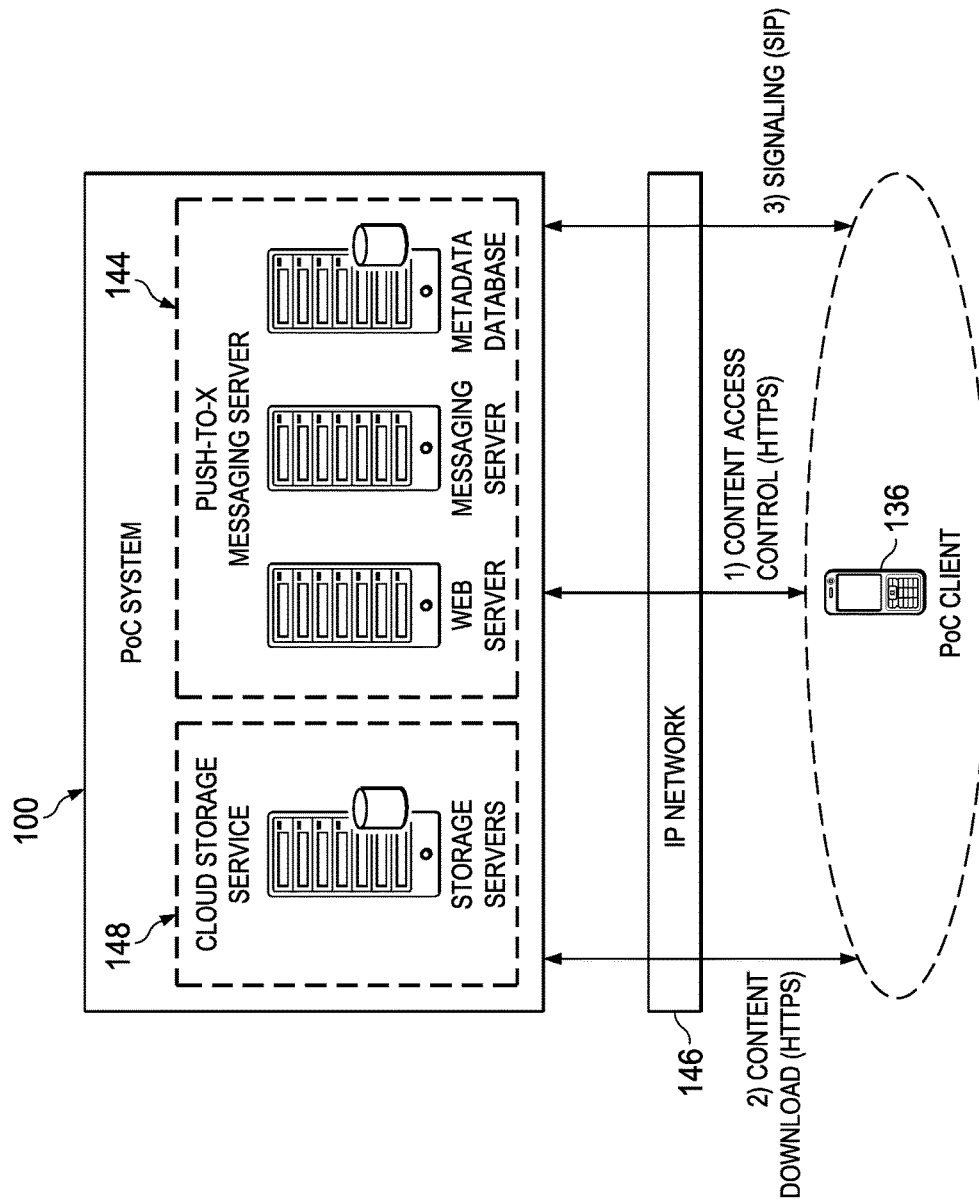
FIG. 6 illustrates the call flow for delivering messages with multimedia contents to clients by a server, according to one embodiment of the present invention.

FIG. 6 illustrates the call flow for delivering messages with multimedia contents to PoC Clients 136 by the Push-to-X Messaging Server 144. The message delivery involves following steps:

1. The Push-to-X Messaging Server 144 notifies the PoC Clients 136 about a new Push-to-X message using any one of the available notification mechanisms. Although SIP-based notifications are typically used to deliver message notifications, the message notification can be delivered through other notification mechanisms, such as Apple notification services or Google notification services. The notification includes the HTTP temporary URL to retrieve the multimedia contents.

2. The recipient PoC Client 136 utilizes the temporary HTTP URL provided by the Push-to-X Messaging Server 144 to access the multimedia contents from the Cloud Storage Services 148 and retrieves the multimedia contents directly from the Cloud Storage Services 148.

3. The recipient PoC Client 136 then reports the complete retrieval of the message to the Push-to-X Messaging Server 144.

The Push-to-X multimedia message delivery notification mechanism is similar to the notification delivery shown in FIGS. 4 and 5 above, except that that additional information is also provided to retrieve the multimedia contents from the Cloud Storage Services 148.

5.4.4 Multimedia Message Retrieval

Figure 7:
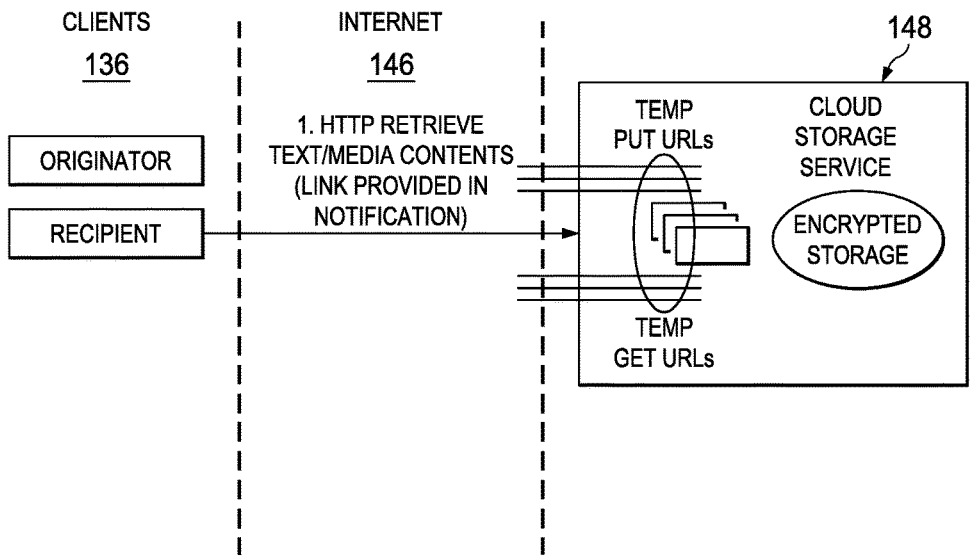
FIG. 7 illustrates the call flow for retrieving multimedia messages by clients from a storage server, according to one embodiment of the present invention.

FIG. 7 illustrates the call flow for retrieving multimedia messages by PoC Clients 136 from the Cloud Storage Services 148. The multimedia message retrieval involves following steps:

1. The message notification sent to the recipient PoC Client 136 includes the HTTP link to the multimedia attachment stored in the Cloud Storage Services 148. Using the link provided, the PoC Client 136 downloads the attachment directly from the Cloud Storage Services 148.

5.4.5 Multimedia Content Transmission Optimization

In wireless networks, the IP connectivity between the PoC Clients 136 and the Cloud Storage Services 148 cannot be guaranteed. Hence, it's possible to lose IP connectivity when the transfer of an attachment is in progress, which would cause the transfer to fail. To address this situation, the Cloud Storage Services 148 supports a chunking mechanism in which the contents of attachments are split into multiple smaller chunks and transmitted separately. The PoC Client 136 starts uploading chunks one-by-one, in sequence, with each chunk identified by a sequence number. If there is an interruption of IP connectivity during the transfer, the PoC Client 136 identifies the last successfully transmitted chunk, based on interworking with the Cloud Storage Service 148, and the next chunk of the attachment in the sequence is sent. The same mechanism is also used to retrieve attachments as well. This mechanism helps to save overall network bandwidth, especially where data usage on a cellular network 124 or wireless data network 126 is considered to be more expensive.

5.4.6 Mechanism to Pull Pending Push-to-X Messages from the Server

If the Push-to-X message is to offline recipients (i.e., not logged into the PoC system 100), then the Push-to-X Messaging Server 144 stores the Push-to-X messages. These messages are referred as pending messages for delivery for the recipient PoC Clients 136. All pending messages to the recipient PoC Clients 136 are delivered when that PoC Clients 136 logs into the PoC system 100 using the mechanism described below:

1. The Push-to-X Messaging Server 144 allows the PoC Client 136 to pull all pending Push-to-X messages that have not been delivered to the PoC Client 136 yet.

2. Only the MDN of the PoC Client 136 specified in the "From" header of the Push-to-X messages (and matched against a user name specified in an "Authorization" header) is required.

3. No additional metadata is defined for this request.

4. The Push-to-X Messaging Server 144 specifies the metadata for each Push-to-X message in the response as described above.

On the other hand, if there are no pending Push-to-X messages for the subscriber, the response will not contain any content.

5.4.7 Optimized Mechanism to Forward Messages that Contain Attachments

Typically, when a Push-to-X message gets forwarded by a recipient of the message, the attachment needs to be uploaded by the PoC Client 136 to the Cloud Storage Services 148. This is a waste of network resources, especially in the transfer of large attachments. Instead, the PoC Client 136 may just re-use a message reference number when the message is forwarded one or more other recipients and the Push-to-X Messaging Server 144 just provides references to the forwarded message in a Push-to-X Notification sent to the recipients. The recipients, in turn, can then retrieve the attachments using the normal HTTP retrieval method as described above. With this mechanism, the PoC Client 136 need not upload the attachments to a forwarded Push-to-X message.

5.4.8 Push-to-X Messaging in PoC Calls

When there is an active PoC call, regardless of whether it is an ad-hoc or pre-arranged group call, the list of active participants could be different from the original intended participants of the call. For example, if the group was created with 10 members, but when the PoC group call was setup, only 8 members were participants in the call. In such cases, it may be useful to have a Push-to-X message exchanged either with all the members of the group or only with active participants of the call. Moreover, it would be useful to have the Push-to-X message exchanged while the PoC group call session is in progress, and it could also be useful to have the Push-to-X message exchanged after PoC group call session is ended.

The Push-to-X Messaging Server 144 interworks with the PoC Server 112 to retrieve a group list and/or an active list of participants of the PoC group call. The PoC Client 136 refers to the PoC group call using a PoC Call Session Id, which is made available to all PoC Clients 136 at the beginning of the call using normal PoC call signaling. The PoC Client 136 can continue to refer to the PoC Call Session Id even after the PoC call is ended. The PoC Server 112 keeps track of the list of participants in the PoC call for a give PoC Call Session Id.

5.4.9 Network-to-Network-Interworking (NNI)

Figure 8:
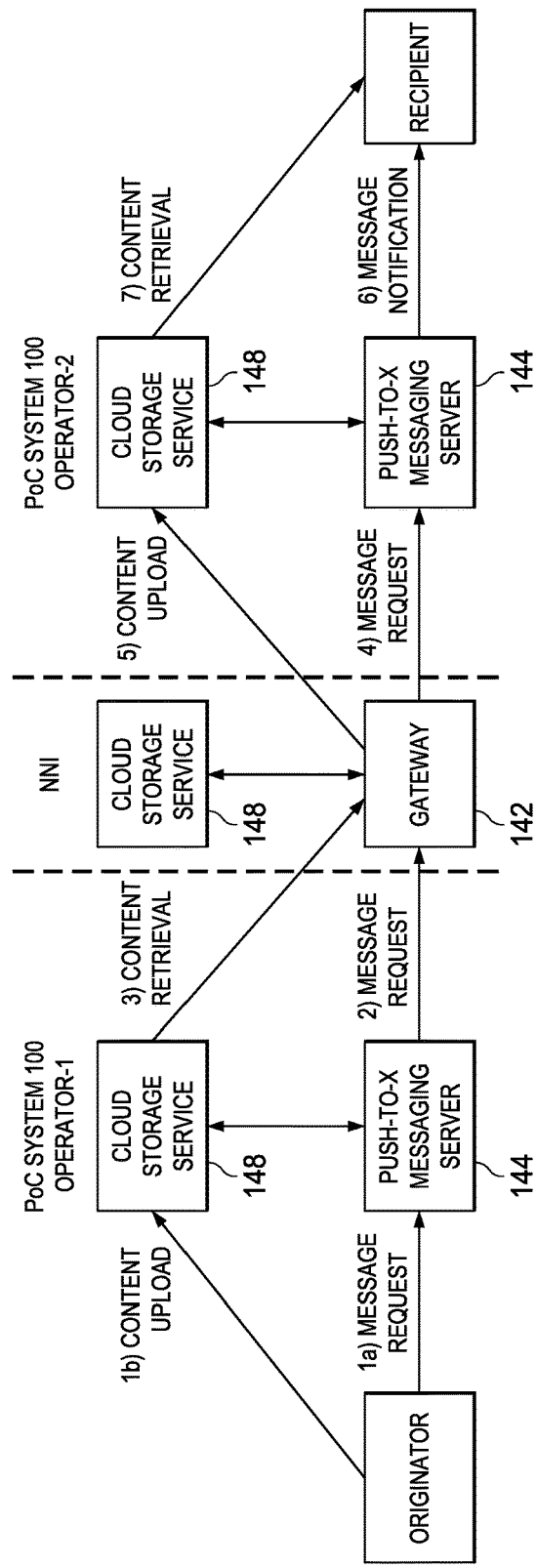
FIG. 8 illustrates Push-to-X Network-to-Network Interworking (NNI), according to one embodiment of the present invention.

FIG. 8 illustrates Push-to-X Network-to-Network Interworking (NNI), according to one embodiment of the present invention. The Push-to-X NNI solution is where a Push-to-X message originated by the user of a first PoC system 100 is delivered to the recipients of a second PoC system 100.

In the originator's PoC system 100, the Push-to-X message origination and attachment upload by the PoC Client 136 to the Push-to-X Messaging Server 144 and Cloud Storage System 148 is performed in the normal manner, as shown by steps 1a) and 1b). However, the Push-to-X NNI solution relies on the Gateway 142 to transport the message request and the attachments from one PoC system 100 to another PoC system 100.

When one or more recipients of the Push-to-X message belongs to a foreign PoC system 100, the originator's Push-to-X Messaging Server 144 delivers a Push-to-X message notification to the NNI Gateway 142, and the NNI Gateway 142 retrieves the Push-to-X message and the attachments from the originator's Cloud Storage System 148, as shown in steps 2) and 3). The NNI Gateway 142 then re-originates the Push-to-X message to the Push-to-X Messaging Server 144 in the second PoC system 100, and stores the attachments into the recipient's Cloud Storage System 148, as shown in steps 4) and 5). Then, the Push-to-X Messaging Server 144 in the second PoC system 100 delivers the Push-to-X messages to recipients in the normal manner, followed by the retrieval of the attachments by the recipients, as shown in steps 6) and 7).

Figure 9:
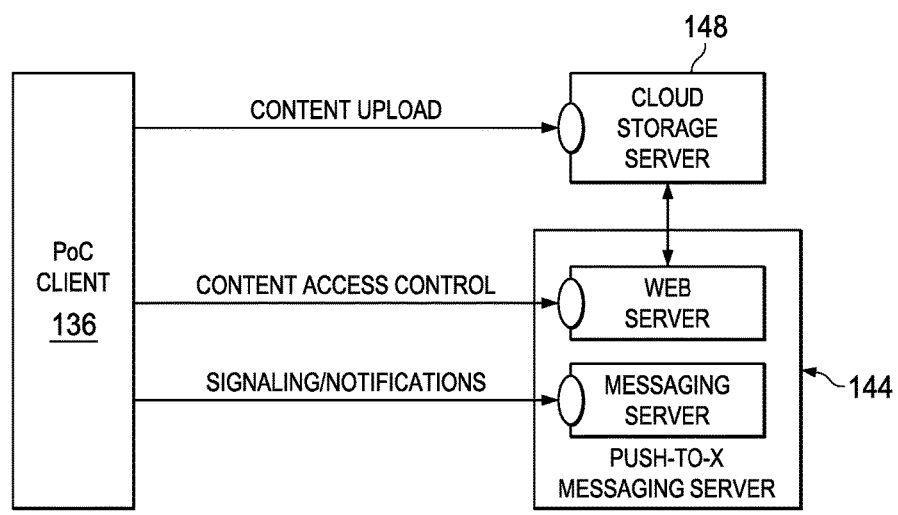
FIG. 9 illustrates a mechanism that enables a network operator to measure the bandwidth utilized for the transfer of multimedia contents separately from the Push-to-X signaling or messaging, according to one embodiment of the present invention.

5.4.10 Mechanism to Differentiate Push-to-X Multimedia Contents from Other Types of Traffic FIG. 9 illustrates a mechanism that enables a network operator to measure the bandwidth utilized for the transfer of multimedia contents separately from the Push-to-X signaling or messaging. This is performed by measuring the multimedia contents transferred directly between the Cloud Storage Services 148 and the PoC Clients 136. The same mechanism can be used to measure and/or specify the Quality of Service (QoS) treatment for the transfer of the multimedia contents directly between the Cloud Storage Services 148 and the PoC Clients 136.

6 Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing communications services in a wireless communications network, the system comprising:
   one or more messaging servers interfacing with the wireless communications networks to provide the communications services to a plurality of mobile units, wherein the plurality of mobile units communicate in a Push-to-Talk (PTT) system, wherein the communications services comprise Push-to-X communications, and wherein the Push-to-X communications comprise a multi-media messaging service (MMS);
   wherein the one or more messaging servers transmits a first control message for a first Push-to-X communication to a first mobile unit of the plurality of mobile units over the communications network;
   wherein attachments for the Push-to-X communications are stored on one or more storage servers, the one or more storage servers being connected to the wireless communications networks;
   wherein a Quality-of-Service for transfer of the attachments for the Push-to-X communications is treated differently from other traffic in the wireless communications network; and
   wherein the first control message identifies a location for retrieving a first attachment for the first Push-to-X communication stored on the one or more storage servers.

2. The system of claim 1, wherein a text message is contained wholly within a second control message for a second Push-to-X transmitted, by the one or more messaging services, to the first mobile unit.

3. The system of claim 1, wherein the attachments for the Push-to-X communications comprise multimedia contents, files, location information, or a combination thereof.

4. The system of claim 1, wherein the one or more storage servers and the plurality of mobile units communicate with each other using a first protocol, and wherein the one or more messaging servers and the plurality of mobile units communicate with each other using a second protocol different from the first protocol.

5. The system of claim 1, wherein the one or more messaging servers and the plurality of mobile units communicate with each other using a Session Initiation Protocol (SIP).

6. The system of claim 1, wherein the one or more messaging servers and the plurality of mobile units communicate with each other using a Hypertext Transport Protocol (HTTP).

7. The system of claim 1, wherein the one or more storage servers and the plurality of the mobile units communicate with each other using a Hypertext Transport Protocol (HTTP).

8. The system of claim 7, wherein the attachments for the Push-to-X communications are uploaded to or downloaded from the one or more storage servers using Uniform Resource Locators (URLs).

9. The system of claim 1, wherein the one or more messaging servers provide the communications services to a single mobile unit identified by a Mobile Directory Number (MDN), a group of mobile units identified by a list of MDNs, or a group of mobile units identified by a Uniform Resource Identifier (URI).

10. The system of claim 1, wherein a gateway transports control messages for the Push-to-X communications and the attachments for the Push-to-X communications between foreign systems.

11. The system of claim 1, wherein the first mobile unit downloads a subset of the attachments for the Push-to-X communications using a Uniform Resource Identifier (URI) provided by the one or more messaging servers.

12. The system of claim 11, wherein the Uniform Resource Identifier (URI) is allocated only when the first mobile unit requests a download of the subset of the attachments for the Push-to-X communications.

13. The system of claim 11, wherein the Uniform Resource Identifier (URI) expires after a specified duration.

14. The system of claim 1, wherein the communications service interfaces with the PTT service to access PTT call states, contact lists, and pre-arranged group lists for the plurality of mobile units.

15. The system of claim 1, wherein transmission of the attachments for the Push-to-X communications is avoided during a PTT call.

16. The system of claim 1, wherein transmission of the attachments for the Push-to-X communications is preempted when the first mobile unit receives or originates a PTT call.

17. The system of claim 14, wherein the Push-To-X communications are performed among participants of a PTT call.

18. A method of providing communications services in a wireless communications network, the method comprising:
   interfacing, by one or more messaging servers, with the wireless communications networks to provide the communications services to a plurality of mobile units, wherein the communications services comprise Push-to-X communications, wherein the Push-to-X communications comprise a multi-media messaging service, and wherein the plurality of mobile units communicate in a Push-to-Talk system;
   transmitting, by the one or more messaging servers, a first control message for a first Push-to-X communication to a first mobile unit of the plurality of mobile units over the communications network;
   wherein attachments for the Push-to-X communications are stored on one or more storage servers, and wherein the one or more storage servers being connected to the wireless communications networks;
   wherein a Quality-of-Service for transfer of the attachments for the Push-to-X communications is treated differently from other traffic in the wireless communications network; and
   wherein the first control message identifies a location for retrieving a first attachment for the first Push-to-X communication stored on the one or more storage servers.

19. A method comprising:
   communicating, by a first mobile unit of a plurality of mobile units, with one or more messaging servers, wherein the plurality of mobile units communicate in a Push-to-Talk (PTT) system, wherein the one or more messaging servers provides Push-to-X communications services to the plurality of mobile units over a wireless communications network, wherein the Push-to-X communications comprise a multi-media messaging service, and wherein attachments for the Push-to-X communications are stored on one or more storage servers connected to the wireless communications network;
   receiving, by the first mobile unit, a control message for a first Push-to-X communication of the Push-to-X communications from the one or more messaging servers, wherein the control message identifies a location for retrieving a first attachment for the first Push-to-X communication; and retrieving, by the first mobile unit, the first attachment from the one or more storage servers, wherein a Quality-of-Service for transfer of the first attachments for the first Push-to-X communication is treated differently from other traffic for the first Push-to-X communication in the wireless communications network.

20. The method of claim 19 further comprising forwarding, by the first mobile unit, one or more of the attachments to a second mobile unit of the plurality of mobile units without uploading the one or more of the attachments to the storage servers.

21. The method of claim 19 further comprising receiving, by the first mobile unit, a list of all pending messages received while the first mobile unit was offline in one single signaling transaction with the one or more messaging servers.

22. The method of claim 19, wherein each of the attachments for the Push-to-X communications is stored in a plurality of chunks, and wherein the plurality of mobile units can upload or retrieve individual ones of the plurality of chunks.

\* \* \* \* \*